(12) United States Patent
Kim et al.

(10) Patent No.: US 11,568,323 B2
(45) Date of Patent: Jan. 31, 2023

(54) ELECTRONIC DEVICE AND CONTROL METHOD THEREOF

(71) Applicant: SAMSUNG ELECTRONICS CO., LTD., Suwon-si (KR)

(72) Inventors: Kyoung-hoon Kim, Suwon-si (KR); Young-hwan Park, Yongin-si (KR); Dong-kwan Suh, Yongin-si (KR); Keshava Prasad Nagaraja, Suwon-si (KR); Dae-hyun Kim, Seoul (KR); Suk-jin Kim, Seoul (KR); Han-su Cho, Suwon-si (KR); Hyun-jung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 16/650,083

(22) PCT Filed: May 16, 2018

(86) PCT No.: PCT/KR2018/005635
§ 371 (c)(1),
(2) Date: Mar. 24, 2020

(87) PCT Pub. No.: WO2019/066183
PCT Pub. Date: Apr. 4, 2019

(65) Prior Publication Data
US 2020/0272946 A1 Aug. 27, 2020

Related U.S. Application Data

(60) Provisional application No. 62/563,369, filed on Sep. 26, 2017.

(30) Foreign Application Priority Data

Dec. 11, 2017 (KR) .................... 10-2017-0169668

(51) Int. Cl.
*G06N 3/04* (2006.01)
*G06N 20/10* (2019.01)
*G06N 3/08* (2006.01)

(52) U.S. Cl.
CPC .......... *G06N 20/10* (2019.01); *G06N 3/0445* (2013.01); *G06N 3/088* (2013.01)

(58) Field of Classification Search
CPC ...... G06N 20/10; G06N 3/0445; G06N 3/088; G06N 3/063; G06N 3/0454; G06N 3/04; G06N 3/08; G06F 17/153
See application file for complete search history.

(56) References Cited

U.S. PATENT DOCUMENTS 9,697,463 B2 7/2017 Ross et al.
9,886,957 B2 2/2018 Seo et al.
(Continued)

FOREIGN PATENT DOCUMENTS

KR 10-2016-0142791 A 12/2016
KR 10-2017-0050029 A 5/2017
(Continued)

OTHER PUBLICATIONS

International Search Report (PCT/ISA/210), issued by International Searching Authority in corresponding International Application No. PCT/KR2018/005635, dated Aug. 24, 2018.
(Continued)

*Primary Examiner* — Khoi V Le
(74) *Attorney, Agent, or Firm* — Sughrue Mion, PLLC

(57) ABSTRACT

Disclosed is an electronic device. The An electronic device including a storage, and a processor configured to perform convolution processing on target data and kernel data based on stride information that indicates an interval at which the kernel data is applied to the target data stored in the storage, in which the processor is further configured to divide the
(Continued)

target data into a plurality of pieces of sub-data based on first stride information, perform the convolution processing on the plurality of pieces of sub-data and a plurality of pieces of sub-kernel data respectively corresponding to the plurality of pieces of sub-data based on second stride information that is different from the first stride information, and combine a plurality of processing results, the plurality of pieces of sub-kernel data are obtained by dividing the kernel data based on the first stride information, and the second stride information indicates that the interval at which the kernel data is applied to the target data is 1.

15 Claims, 14 Drawing Sheets

(56) References Cited

U.S. PATENT DOCUMENTS

| | | | |
|---|---|---|---|
| 2011/0138157 | A1 | 6/2011 | Ni et al. |
| 2015/0036920 | A1 | 2/2015 | Wu et al. |
| 2015/0170021 | A1 | 6/2015 | Lupon et al. |
| 2015/0255062 | A1 | 9/2015 | Penn et al. |
| 2016/0196480 | A1 | 7/2016 | Heifets et al. |
| 2016/0342888 | A1 | 11/2016 | Yang et al. |
| 2016/0358069 | A1 | 12/2016 | Brothers et al. |
| 2017/0097884 | A1 | 4/2017 | Werner et al. |
| 2017/0103298 | A1 | 4/2017 | Ling et al. |
| 2017/0140236 | A1 | 5/2017 | Price et al. |
| 2017/0193361 | A1 | 7/2017 | Chilimbi et al. |
| 2017/0316312 | A1* | 11/2017 | Goyal .......... G06N 3/0454 |
| 2018/0113649 | A1* | 4/2018 | Shafiee Ardestani .. G06N 3/063 |

FOREIGN PATENT DOCUMENTS

| | | |
|---|---|---|
| KR | 10-2017-0099875 A | 9/2017 |
| WO | 2016/105841 A1 | 6/2016 |

OTHER PUBLICATIONS

Written Opinion (PCT/ISA/237) issued by the International Searching Authority in corresponding International Application No. PCT/KR2018/005635, dated Aug. 24, 2018.

Zidong Du et al. "ShiDianNao: Shifting Vision Processing Closer to the Sensor" ISCA 15, Jun. 13-17, 2015, (pp. 92-104).

Norman P. Jouppi et al. "In-Datacenter Performance Analysis of a Tensor Processing Unit tm" International Symposium on Computer Architecture, Jun. 26, 2017, (pp. 1-17).

Jorge Albericio et al. "Cnvlutin: Ineffectual-Neuron-Free Deep Neural Network Computing" ACM SIGARCH Computer Architecture News, Jun. 2016, (pp. 1-13).

Yu-Hsin Chen et al. "Eyeriss: An Energy-Efficient Reconfigurable Accelerator for Deep Convolutional Neural Networks" IEEE Journal of Solid-State Circuits, 2016, (pp. 1-12).

Communication dated Jul. 16, 2020, from the European Patent Office in European Application No. 18860756.8.

Tahmid Abtahi et al., "Accelerating Convolutional Neural Network with FFT on Tiny Cores", IEEE International Symposium on Circuits and Systems, May 28, 2017, pp. 1-4 (4 pages total).

Yuan Du et al., "A Streaming Accelerator for Deep Convolutional Neural Networks with Image and Feature Decomposition for Resource-limited System Applications", retrieved from URL:https://arxiv.org/ftp/arxiv/papers/1709/1709.05116.pdf, Sep. 15, 2017, pp. 1-5 (5 pages total).

Lili Song et al., "C-Brain: A Deep Learning Accelerator that Tames the Diversity of CNNs through Adaptive Data-level Parallelization", ACM Press, Jun. 5, 2016, pp. 1-6 (6 pages total).

Communication dated Jan. 3, 2022 issued by the European Patent Office in counterpart European Application No. 18 860 756.8.

Communication dated Jun. 10, 2022 issued by the Korean Intellectual Property Office in counterpart English Korean Application No. 10-2017-0169668 Translation.

* cited by examiner

FIG. 5A

ELECTRONIC DEVICE AND CONTROL METHOD THEREOF

TECHNICAL FIELD

This disclosure relates to an electronic device and a control method thereof and, more particularly, to an electronic device executing convolution processing and a control method thereof.

BACKGROUND ART

Machine learning is a field of artificial intelligence and means a technology of generating new knowledge by training a computer by inputting data thereto. Particularly, machine learning has been significantly developed in a field of artificial neural network which is one of the machine learning technologies and this has brought deep learning.

Deep learning is a type of machine learning technologies based on artificial neural network and may improve learning efficiency by preprocessing data for learning using unsupervised learning or collectively transmitting data over a plurality of layers, although the artificial neural network is designed with a multilayer structure. Particularly, the deep learning has been rapidly developed recently along with big data by the development of the Internet and the improvement of computing performance for processing this.

In the technology, a convolutional neural network (CNN) has a structure suitable for the learning of two-dimensional data and enables training through a backpropagation algorithm. The CNN has been broadly used in various applications such as object classification or object detection in images.

Most of processing performed in the CNN is convolution processing which causes necessity of efficiently executing the convolution processing, but the efficiency may deteriorate in specific cases.

FIGS. 1A and 1B are drawings for describing a problem of the convolution processing according to a conventional technology. First, FIG. 1A shows that a stride is 1 and FIG. 1B shows that a stride is 2. The stride means an interval at which kernel data is applied to target data (e.g., an image).

As shown in FIG. 1A, kernel data is processed with a first region 101 of target data in a first cycle and a piece of pixel data of Accumulation having the following value may be calculated.

$$a1+b2+c3+d4+e5+f6+g7+h8+i9$$

The kernel data is processed with a second region 102 of the target data in a second cycle by the same method and a result obtained by executing such a process over the entire target data is Accumulation on the right side of the drawing.

The convolution processing is executed by moving the kernel data on the target data by one pixel. Meanwhile, when the stride is 2 as shown in FIG. 1B, the convolution processing is executed by moving the kernel data on the target data by two pixels.

That is, as shown in FIG. 1B, the kernel data is processed with a third region 103 of the target data in the first cycle and a piece of pixel data of Accumulation may be calculated.

The kernel data is processed with a fourth region 104 of the target data in the second cycle by the same method and the fourth region herein may be a region having an interval from the third region by two pixels. A result obtained by executing such a process over the entire target data is shaded parts in Accumulation on the right side of the drawing. That is, a data size of Accumulation in which the stride is 2 is merely ¼ of a data size of Accumulation in which the stride is 1.

However, the operations in terms of hardware are not significantly different in both cases of FIGS. 1A and 1B. Specifically, even in the case of FIG. 1B, the convolution processing is executed by moving the kernel data on the target data by one pixel in the same manner as in FIG. 1A and Accumulation same as that in FIG. 1A is calculated. After that, only the shaded parts of FIG. 1B are obtained from the calculated Accumulation and a result when the stride is 2 is obtained.

That is, in terms of hardware, the processing is executed for the unshaded parts of FIG. 1B and this is a result value unnecessary in the convolution processing when the stride is 2. When the stride is greater than 2, the utilization of hardware further decreases.

Therefore, there has been needs for development of a convolution processing method not decreasing utilization of hardware, even when the stride is 2 or greater.

DISCLOSURE

Technical Problem

The disclosure has been made in accordance with the above-described needs, and an object of the disclosure is to provide an electronic device for improving hardware utilization in convolution processing process and a control method thereof.

Technical Solution

According to an embodiment of the disclosure for achieving the afore-mentioned object, an electronic device includes a storage, and a processor configured to perform convolution processing on target data and kernel data based on stride information that indicates an interval at which the kernel data is applied to the target data stored in the storage, in which the processor divides the target data into a plurality of pieces of sub-data based on first stride information, performs the convolution processing on the plurality of pieces of sub-data and a plurality of pieces of sub-kernel data respectively corresponding to the plurality of pieces of sub-data based on second stride information that is different from the first stride information, and combines a plurality of processing results, the plurality of pieces of sub-kernel data are obtained by dividing the kernel data based on the first stride information, and the second stride information indicates that the interval at which the kernel data is applied to the target data is 1.

Based on the first stride information that is n (n is an integer greater than 1), the processor may divide the target data into a plurality of n×n pieces of sub-data, and the plurality of pieces sub-kernel data may be obtained by dividing the kernel data into n×n pieces.

The processor may identify each of the plurality of n×n pieces of sub-data as two-dimensional information of (i,j) (each of i and j is a natural number of n or less) and obtain a value lying in a row of (n×a+i) and a column of (n×b+j) of the target data as a value of the sub-data corresponding to (i,j), and each of a and b may be a natural number of 0 or greater.

The plurality of processing results may be in matrix forms having different sizes, the processor, based on a first matrix having a largest size among the plurality of processing results, may extend sizes of other matrices, and combine values at the same position between values included in the first matrix and values included in the extended other matrices, and an extended region of the other matrices may have a value of 0.

The processor may include a plurality of processing element units including a plurality of processing elements each arranged in a matrix form, a data scatter having one side connected to the storage and the other side connected to each of the plurality of processing element units, and an accumulator having one side connected to each of the plurality of processing element units and the other side connected to the storage.

The data scatter may receive the target data from the storage, divide the target data into the plurality of pieces of sub-data, and transmit the plurality of pieces of sub-data respectively to the plurality of processing element units, each of the plurality of processing element units may perform the convolution processing based on sub-kernel data corresponding to the sub-data received from the data scatter and transmit processing results to the accumulator, and the accumulator may combine the plurality of processing results respectively received from the plurality of processing element units.

Based on the first stride information in which a row is m (m is an integer greater than 1) and a column is n (n is an integer greater than 1), the processor may divide the target data into a plurality of m×n pieces of sub-data, and the plurality of pieces of sub-kernel data may be obtained by dividing the kernel data into m×n pieces.

Based on the first stride information that is n (n is an integer greater than 1), the processor may divide the kernel data into a plurality of n×n pieces of sub-kernel data, and perform the convolution processing on the plurality of pieces of sub-data and a plurality of pieces of sub-kernel data respectively corresponding to the plurality of pieces of sub-data based on the second stride information.

The processor may identify each of the plurality of n×n pieces of sub-kernel data as two-dimensional information of (i,j) (each of i and j is a natural number of n or less) and obtain a value lying in a row of (n×a+i) and a column of (n×b+j) of the kernel data as a value of the sub-kernel data corresponding to (i,j), and each of a and b may be a natural number of 0 or greater.

The processor may execute the convolution processing using the plurality of pieces of sub-kernel data included in a sub-kernel data set corresponding to the first stride information among a plurality of sub-kernel data sets stored in the storage in advance, and the plurality of sub-kernel data sets may be obtained by dividing the kernel data based on pieces of stride information different from each other.

According to another embodiment of the disclosure, a control method of an electronic device includes, based on first stride information that indicates an interval at which kernel data is applied to target data, dividing the target data into a plurality of pieces of sub-data, performing convolution processing on the plurality of pieces of sub-data and a plurality of pieces of sub-kernel data respectively corresponding to the plurality of pieces of sub-data based on second stride information that is different from the first stride information, and combining a plurality of processing results, the plurality of pieces of sub-kernel data are obtained by dividing the kernel data based on the first stride information, and the second stride information indicates that the interval at which the kernel data is applied to the target data is 1.

Based on the first stride information that is n (n is an integer greater than 1), the dividing may include dividing the target data into a plurality of n×n pieces of sub-data, and the plurality of pieces of sub-kernel data may be obtained by dividing the kernel data into n×n pieces.

The dividing may include identifying each of the plurality of n×n pieces of sub-data as two-dimensional information of (i,j) (each of i and j is a natural number of n or less), and obtaining a value lying in a row of (n×a+i) and a column of (n×b+j) of the target data as a value of the sub-data corresponding to (i,j), and each of a and b may be a natural number of 0 or greater.

The plurality of processing results may be in matrix forms having different sizes, and the combining may include, based on a first matrix having a largest size among the plurality of processing results, extending sizes of other matrices, and combining values at the same position between values included in the first matrix and values included in the extended other matrices, and an extended region of the other matrices may have a value of 0.

The dividing may include, based on the first stride information in which a row is m (m is an integer greater than 1) and a column is n (n is an integer greater than 1), dividing the target data into a plurality of m×n pieces of sub-data, and the plurality of pieces of sub-kernel data may be obtained by dividing the kernel data into m×n pieces.

The method may further comprise, based on the first stride information that is n (n is an integer greater than 1), dividing the kernel data into a plurality of n×n pieces of sub-kernel data, and performing the convolution processing on the plurality of pieces of sub-data and a plurality of pieces of sub-kernel data respectively corresponding to the plurality of pieces of sub-data based on the second stride information.

The dividing may include identifying each of the plurality of n×n pieces of sub-kernel data as two-dimensional information of (i,j) (each of i and j is a natural number of n or less), and obtaining a value lying in a row of (n×a+i) and a column of (n×b+j) of the kernel data as a value of the sub-kernel data corresponding to (i,j), and each of a and b may be a natural number of 0 or greater.

The performing the convolution processing may include executing the convolution processing using the plurality of pieces of sub-kernel data included in a sub-kernel data set corresponding to the first stride information among a plurality of sub-kernel data sets stored in advance, and the plurality of sub-kernel data sets may be obtained by dividing the kernel data based on pieces of stride information different from each other.

According to still another embodiment of the disclosure, a non-transitory computer readable medium storing computer instructions for executing an operation method of an electronic device, in which the operation includes, based on first stride information that indicates an interval at which kernel data is applied to target data, dividing the target data into a plurality of pieces of sub-data, performing convolution processing on the plurality of pieces of sub-data and a plurality of pieces of sub-kernel data respectively corresponding to the plurality of pieces of sub-data based on second stride information that is different from the first stride information, and combining a plurality of processing results, the plurality of pieces of sub-kernel data are obtained by dividing the kernel data based on the first stride information, and the second stride information indicates that the interval at which the kernel data is applied to the target data is 1.

Effect of Invention

According to various embodiments of the disclosure described above, even when the interval at which the kernel data is applied to the target data is 2 or greater, the electronic device may improve the hardware utilization by executing the convolution processing at an interval of 1.

are diagrams for describing a processing method according to another embodiment.

Figure 6:
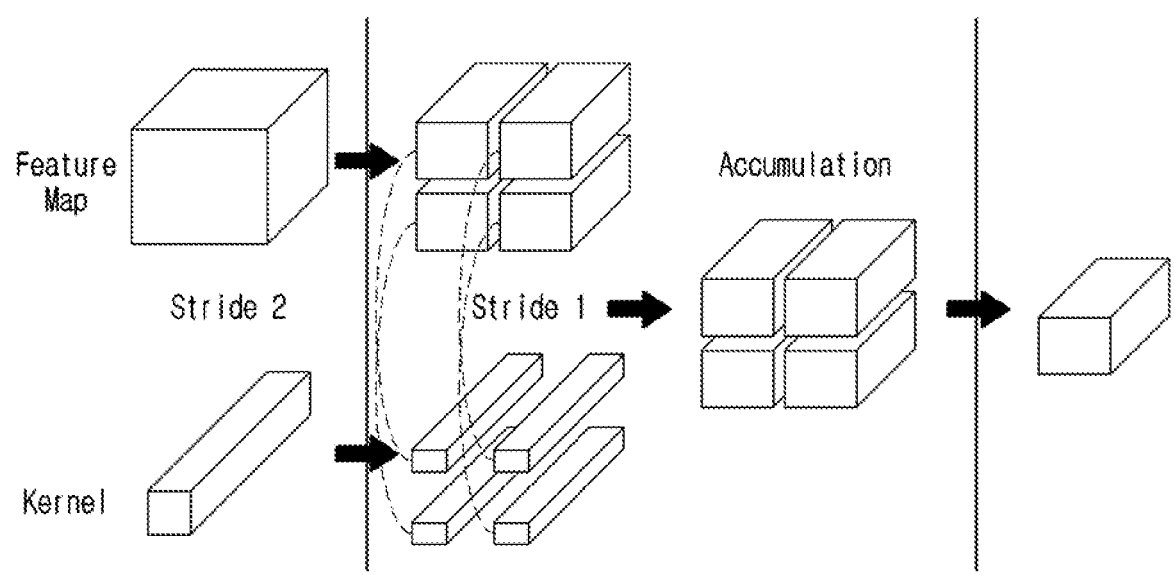

FIG. 6 is a diagram for describing a processing method of three-dimensional data according to an embodiment.

Figure 7:
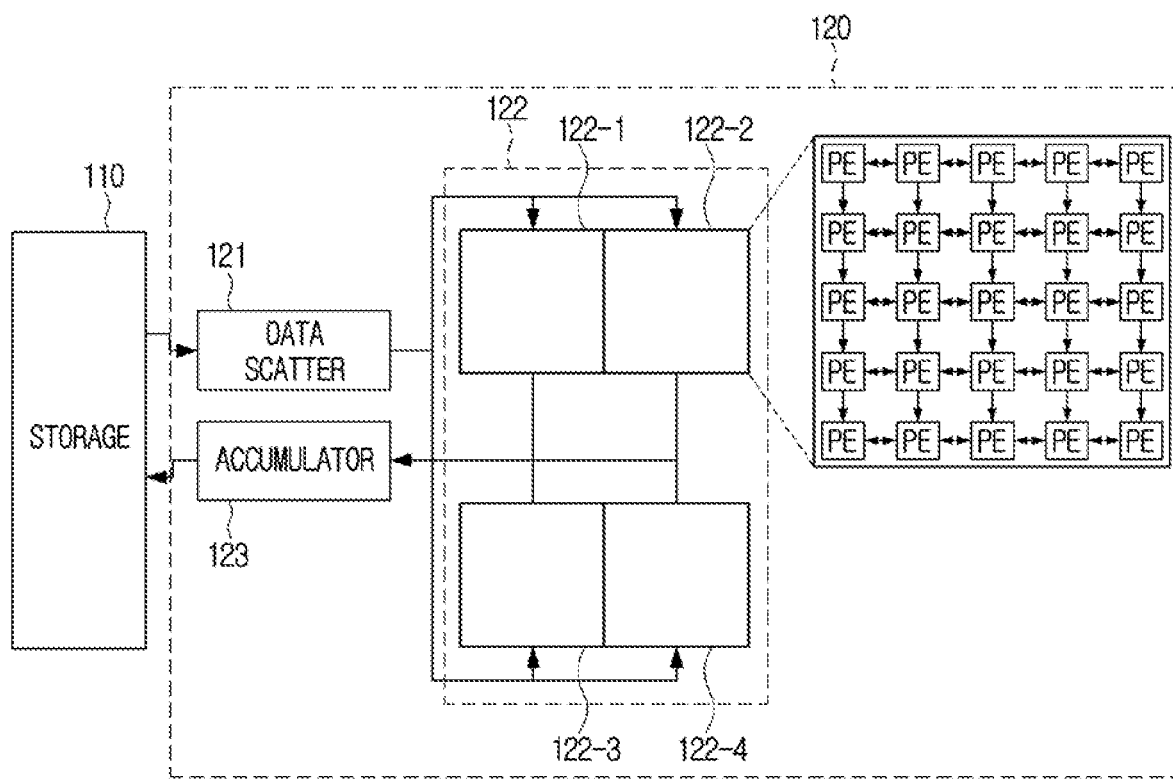

FIG. 7 is a diagram for describing a specific configuration of a processor according to an embodiment.

Figure 8:
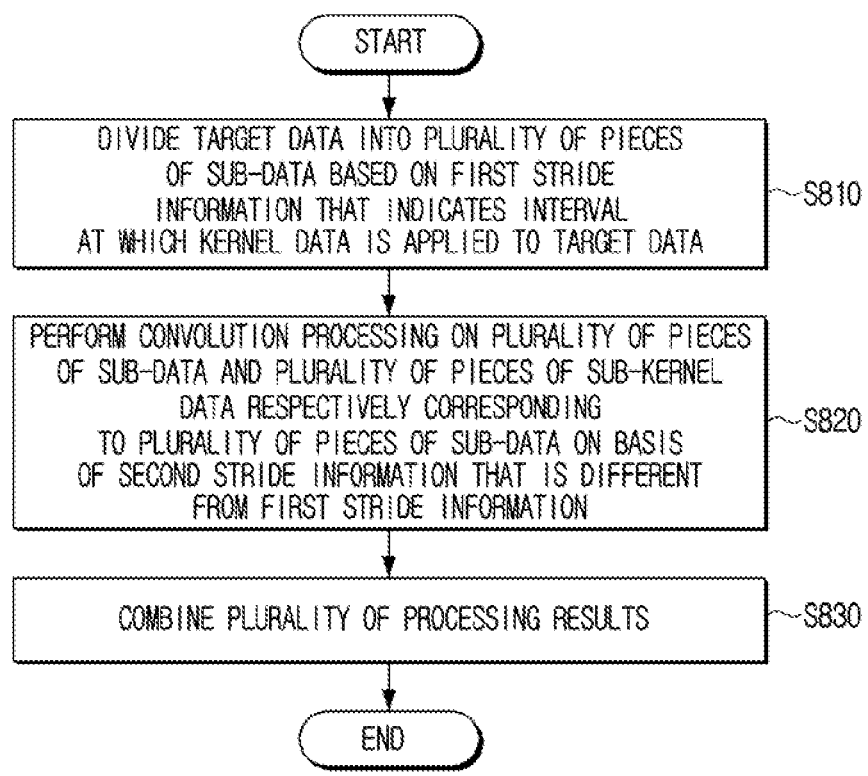

FIG. 8 is a flowchart for describing a control method of an electronic device according to an embodiment.

DETAILED DESCRIPTION OF EXEMPLARY EMBODIMENTS

Hereinafter, various embodiments of the disclosure will be described in detail with reference to the accompanying drawings.

Figure 1A:
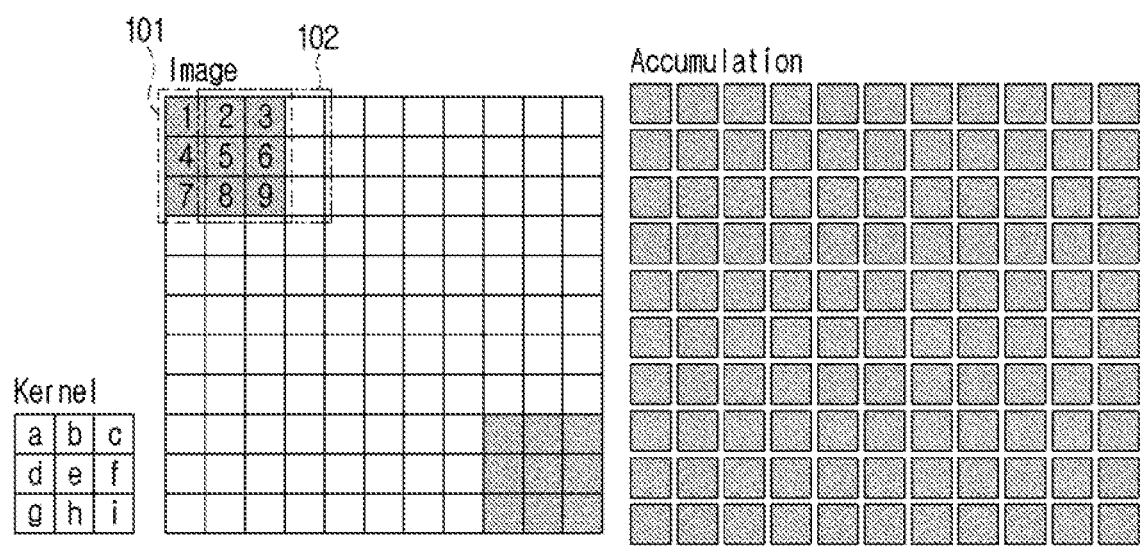
FIGS. 1A and 1B are diagrams for describing a problem of convolution processing according to a conventional technology.
Figure 1B:
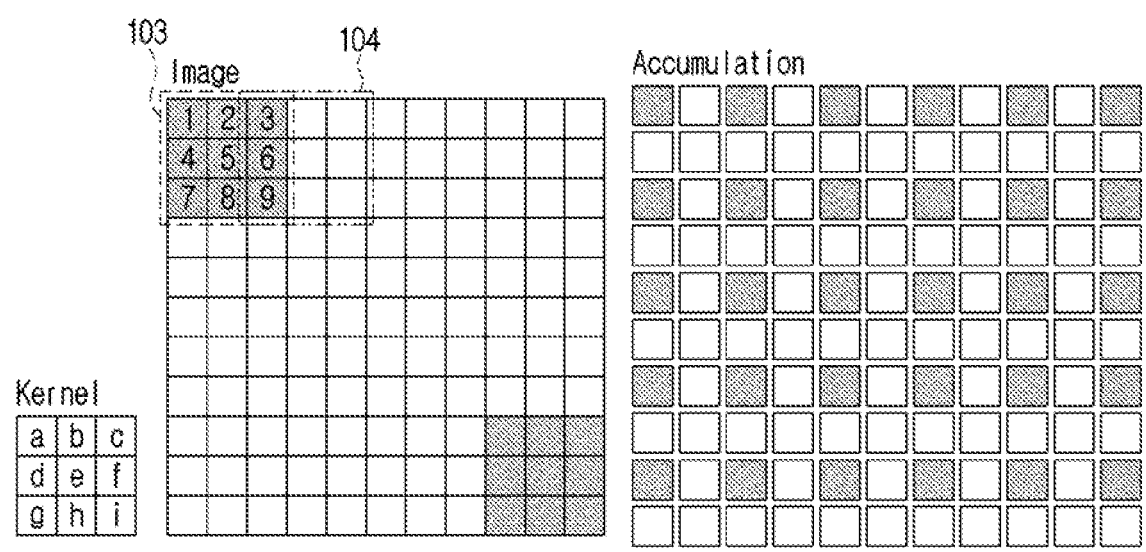
Figure 2:
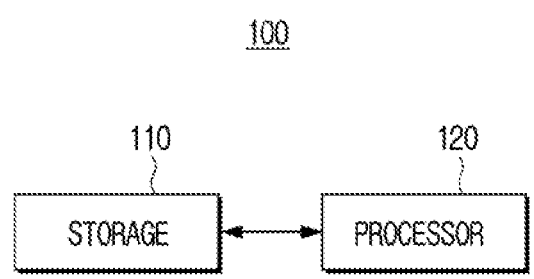
FIG. 2 is a block diagram showing a configuration of an electronic device according to an embodiment.

FIG. 2 is a block diagram showing a configuration of an electronic device 100 according to an embodiment of the disclosure.

As shown in FIG. 2, the electronic device 100 includes a storage 110 and a processor 120.

The electronic device 100 may execute convolution processing. For example, the electronic device 100 may be a desktop PC, a notebook, a smart phone, a tablet PC, a server, or the like. In addition, the electronic device 100 may be a system with a constructed clouding computing environment. However, the embodiment is not limited thereto and the electronic device 100 may be any device as long as it may execute the convolution processing.

The convolution processing herein is processing executed with great importance in a field of deep learning and may be processing emphasizing characteristics that target data and kernel data correspond to each other through the processing on the target data and the kernel data.

For example, the target data may be image data having a resolution of 1920×1080 and the kernel data may be a sharpening filter of 3×3. The kernel data may be multiplied with a region of 3×3 positioned on one side of the target data for each element and the multiplied results may be added up to generate one piece of data. The convolution processing may be executed by repeatedly executing such processing by moving the kernel data on the target data. When the zero padding is applied, the convolution processing results may be formed in the size same as that of the target data, and when zero padding is not applied, the convolution processing results may be formed in a size slightly smaller than that of the target data. Through the convolution processing on the image data and the sharpening filter described above, image data sharpener than the initial image data may be generated. However, this is merely an embodiment, and the convolution processing may be executed on any other types of pieces of data and the convolution processing may be any convolution processing usable in the field of deep learning.

The storage 110 may store the target data, the kernel data, processing instructions, and the like. When a processing instruction is convolution processing instruction, the processing instruction may include stride information. The stride information indicates an interval at which the kernel data is applied to the target data.

The storage 110 may store at least one piece of kernel data.

The storage 110 may store a plurality of sub-kernel data sets. Herein, each of the plurality of sub-kernel data sets may include a plurality of pieces of sub-kernel data divided from one piece of kernel data based on pieces of stride information different from each other.

For example, a first sub-kernel data set among the plurality of sub-kernel data sets may include a plurality of pieces of first sub-kernel data divided from the kernel data based on first stride information, and a second sub-kernel data set among the plurality of sub-kernel data sets may include a plurality of pieces of second sub-kernel data divided from the kernel data based on second stride information.

Alternatively, the storage 110 may store the plurality of sub-kernel data sets of each of a plurality of pieces of kernel data. For example, the storage 110 may store a plurality of first sub-kernel data sets of first kernel data and a plurality of second sub-kernel data sets of second kernel data.

Meanwhile, the plurality of pieces of sub-kernel data may be generated by the electronic device 100 or may be information that is generated by and received from an external electronic device other than the electronic device 100.

The convolution processing based on the stride information and the plurality of pieces of sub-kernel data described above will be described later in detail.

The storage 110 may be implemented as a hard disk, a non-volatile memory, or a volatile memory.

The processor 120 generally controls the operations of the electronic device 100.

In an embodiment, the processor 120 may be implemented as a digital signal processor (DSP), a microprocessor, or a time controller (TCON). However, the processor is not limited thereto, and may include or defined as one or more of a central processing unit (CPU), a microcontroller unit (MCU), a microprocessing unit (MPU), a controller, an application processor (AP), a communication processor (CP), and an ARM processor. In addition, the processor 140 may be implemented as a system on chip (SoC) or a large scale integration (LSI) with embedded processing algorithms or may be implemented in a form of a field programmable gate array (FPGA).

The processor 120 may perform the convolution processing on the target data and the kernel data based on stride information that indicates an interval at which the kernel data is applied to the target data stored in the storage 110.

The processor 120 may divide the target data into a plurality of pieces of sub-data based on the first stride information, perform the convolution processing on the plurality of pieces of sub-data and a plurality of pieces of sub-kernel data respectively corresponding to the plurality of pieces of sub-data based on second stride information that is different from the first stride information, and combine a plurality of processing results.

The plurality of pieces of sub-kernel data herein may be obtained by dividing the kernel data based on the first stride information. The second stride information may indicate that an internal at which the kernel data is applied to the target data is 1. That is, the first stride information may indicate that an internal at which the kernel data is applied to the target data is 2 or greater.

Based on the first stride information that is n (n is an integer greater than 1), the processor 120 may divide the target data into a plurality of n×n pieces of sub-data and the plurality of pieces of sub-kernel data may be obtained by dividing the kernel data into n×n pieces.

For example, based on the first stride information that is 2, the processor 120 may divide the target data into a plurality of 2×2=4 pieces of sub-data. In addition, the plurality of pieces of sub-kernel data may be obtained by dividing the kernel data into 2×2=4 pieces.

However, there is no limitation thereto and the first stride information may be different with respect to the row and the column of the target data. That is, based on the first stride information in which a row is m (m is an integer greater than 1) and a column is n (n is an integer greater than 1), the processor 120 may divide the target data into a plurality of m×n pieces of sub-data. The processor 120 may use the plurality of pieces of sub-kernel data obtained by dividing the kernel data into m×n pieces for the convolution processing.

For example, based on the first stride information in which the row is 3 and the column is 2, the processor 120 may divide the target data into a plurality of 3×2 pieces of sub-data. The processor 120 may use the plurality of pieces of sub-kernel data obtained by dividing the kernel data into 3×2 pieces for the convolution processing.

The processor 120 may identify each of the plurality of n×n pieces of sub data as two-dimensional information of (i,j) (each of i and j is a natural number of n or less) and obtain a value lying in a row of (n×a+i) and a column of (n×b+j) of the target data as a value of the sub-data corresponding to (i,j). Each of a and b may be a natural number of 0 or greater. A specific method for dividing the target data will be described later with reference to drawings.

Meanwhile, the plurality of processing results may be in matrix forms having different sizes, and the processor 120, based on a first matrix having a largest size among the plurality of processing results, may extend sizes of other matrices, and combine values at the same position between values included in the first matrix and values included in the extended other matrices. An extended region of the other matrices may have a value of 0.

For example, when four processing results are generated through the convolution processing, a first processing result may be in a matrix form of 2×2, a second processing result may be in a matrix form of 2×3, a third processing result may be in a matrix form of 3×2, and a fourth processing result may be in a matrix form of 4×4. The processor 120 may extend the first to third processing results in a matrix form of 4×4 and the value of the row or the column added at the time of the extension may be 0.

In the extension of the processing results, the processor 120 may extend a right side or a lower side of the matrix. In the example described above, the processor 120 may extend the matrix form of 2×2 into the matrix form of 4×4 by adding 0 to the right side and the lower side of the first processing result.

The processor 120 may combine values at the same position between values included in the first matrix and values included in the extended other matrices. That is, the processor 120 may add each values for each element. According to the example described above, the added result may be a matrix form of 4×4.

However, there is no limitation thereto, and the processor 120 may estimate a size of a second matrix having the smallest size among the plurality of processing results and execute the processing to correspond to the estimated size. The specific description regarding this will be describe later with reference to the drawings.

Meanwhile, the processor 120 may include a plurality of processing element units including a plurality of processing elements each arranged in a matrix form, a data scatter having one side connected to the storage 110 and the other side connected to each of the plurality of processing element units, and an accumulator having one side connected to each of the plurality of processing element units and the other side connected to the storage 110.

The data scatter may receive the target data from the storage 110, divide the target data into the plurality of pieces of sub-data, and transmit the plurality of pieces of sub-data respectively to the plurality of processing element units. In this case, the data scatter may include a storage element for storing the plurality of pieces of sub-data.

Alternatively, the data scatter may distribute the received target data to the plurality of processing element units in real time. For example, the data scatter may be formed as at least one multiplexer and may sequentially distribute the target data to the plurality of processing element units, when the target data is sequentially input. That is, the data scatter may change only a path of data input in real time and the plurality of pieces of sub-data may be stored in each of the plurality of processing element units after the completion of distribution.

Each of the plurality of processing element units may execute the convolution processing based on the sub-kernel data corresponding to the sub-data received from the data scatter and transmit the processing result to the accumulator.

The accumulator may combine the plurality of processing results respectively received from the plurality of processing element units.

The processor 120 may divide the kernel data into the plurality of pieces of sub-kernel data. Specifically, based on the first stride information that is n (n is an integer greater than 1), the processor 120 may divide the kernel data into a plurality of n×n pieces of sub-kernel data, and perform the convolution processing on the plurality of pieces of sub-data and the plurality of pieces of sub-kernel data respectively corresponding to the plurality of pieces of sub-data based on the second stride information.

However, there is no limitation thereto and the first stride information may be different with respect to the row and the column of the kernel data. That is, based on the first stride information in which a row is m (m is an integer greater than 1) and a column is n (n is an integer greater than 1), the processor 120 may divide the kernel data into a plurality of m×n pieces of sub-kernel data.

The processor 120 may identify each of the plurality of n×n pieces of sub-kernel data as two-dimensional information of (i,j) (each of i and j is a natural number of n or less) and obtain a value lying in a row of (n×a+i) and a column of (n×b+j) of the kernel data as a value of the sub-kernel data corresponding to (i,j). Each of a and b may be a natural number of 0 or greater. That is, a method for forming the plurality of pieces of sub-kernel data may be the same as a method for forming the plurality of pieces of sub-data.

The processor 120 may execute the convolution processing using the plurality of pieces of sub-kernel data included in the sub-kernel data set corresponding to the first stride information among the plurality of sub-kernel data sets stored in the storage 110 in advance. The plurality of sub-kernel data sets may be obtained by dividing the kernel data based on pieces of stride information different from each other.

That is, the storage 110 may store the plurality of sub-kernel data sets obtained by dividing the kernel data in advance based on pieces of stride information different from each other, and the processor 120 may execute the convolution processing based on the information stored in the storage 110. In this case, the processor 120 does not execute the operation of dividing the kernel data. A method for generating the plurality of sub-kernel data sets may be the same as the method for dividing the kernel data directly by the processor 120, except that the dividing operation is executed by an external electronic device other than the electronic device 100 and the electronic device 100 only receives these from the external electronic device and stores these.

Hereinabove, the convolution processing method of the electronic device 100 has been briefly described. Hereinafter, the convolution processing method of the electronic device 100 will be described with reference to specific drawings and the improvement of hardware utilization along this will be described.

Figure 3A:
FIGS. 3A to 3C are diagrams for describing a method for dividing target data and kernel data according to an embodiment.
Figure 3B:

FIGS. 3A to 3B are diagrams for describing a method for dividing the target data and the kernel data according to an embodiment of the disclosure.

First, FIG. 3A is a diagram for describing a method for dividing the target data, when the stride information is 2.

When the stride information is 2, the processor 120 may divide the target data into the plurality of 2×2=4 pieces of sub-data.

Specifically, the processor 120 may identify each of the plurality of 2×2=4 pieces of sub-data as two-dimensional information of (i,j) (each of i and j is a natural number of n or less). Herein, each of i and j is a natural number of n or less and therefore i and j may be respectively 1 and 2.

For example, the processor 120 may identify each of the plurality of four pieces of sub-data as (1,1), (1,2), (2,1), and (2,2).

The processor 120 may obtain a value lying in a row of (n×a+i) and a column of (n×b+j) of the target data as a value of the sub-data corresponding to (i,j). Each of a and b may be a natural number of 0 or greater.

For example, assuming a case of forming the sub-data identified as (1,1), the processor 120 may obtain a value lying in a row of (2×a+1) and a column of (2×b+1) of the target data. Each of a and b herein is a natural number greater than 0, and thus, when each of a and b are put in the row of (2×a+1) and the column of (2×b+1) sequentially from 0, values lying in a row of (1) and a column of (1), a row of (1) and a column of (3), a row of (1) and a column of (5), a row of (1) and a column of (7), a row of (1) and a column of (9), a row of (3) and a column of (1), a row of (3) and a column of (3), a row of (3) and a column of (5), a row of (3) and a column of (7), a row of (3) and a column of (9), and a row of (9) and a column of (9) may be obtained. A right side of FIG. 3A shows four pieces of sub-data and the sub-data on the upper left side among these indicates sub-data identified as (1,1).

In the above example, a case where each of a and b is equal to or less than 4 has been described. When a or b is equal to or greater than 5, there is no need for consideration because there is no value corresponding to the target data. That is, the processor 120 may identify there is no value obtainable from the target data when the a or b is equal to or greater than 5, and may change at least one value of a and b or finish the generation of the sub-data.

For example, a is set as 1 and the b is enlarged sequentially from 1, and when a is set as 1 and b is set as 5, there is no value corresponding to the target data, and accordingly, the processor 120 may change a as 2 and b as 1 to obtain a value corresponding to the target data.

In another example, assuming a case of forming the sub-data identified as (1,2), the processor 120 may obtain a value lying in a row of (2×a+1) and a column of (2×b+2) of the target data. Each of a and b herein is a natural number of 0 or greater, and thus, when each of a and b are put in the row of (2×a+1) and the column of (2×b+2) sequentially from 0, values lying in a row of (1) and a column of (2), a row of (1) and a column of (4), a row of (1) and a column of (6), a row of (1) and a column of (8), a row of (1) and a column of (10), a row of (3) and a column of (2), a row of (3) and a column of (4), a row of (3) and a column of (6), a row of (3) and a column of (8), a row of (3) and a column of (10), and a row of (9) and a column of (10) may be obtained. The sub-data on the upper right side in FIG. 3A indicates sub-data identified as (1,2).

Through the above method, the processor 120 may form the other two pieces of sub-data.

FIG. 3B is a diagram for describing a method for dividing the kernel data, when the stride information is 2. The method for dividing the kernel is the same as the method for dividing the target data of FIG. 3A, and therefore the overlapped description will be omitted.

Figure 3C:

FIG. 3C is a diagram for describing the method for dividing the kernel data, when the stride information is 3.

When the stride information is 3, the processor 120 may divide the kernel data into a plurality of 3×3=9 pieces of sub-kernel data.

Specifically, the processor 120 may identify each of a plurality of 3×3=9 pieces of sub-kernel data as two-dimensional information of (i,j) (each of i and j is a natural number of n or less). Herein, each of i and j is a natural number of n or less and therefore i and j may be respectively 1, 2, and 3.

For example, the processor 120 may identify each of the plurality of nine pieces of sub-kernel data as (1,1), (1,2), (1,3), (2,1), (2,2), (2,3), (3,1), (3,2), and (3,3).

The processor 120 may obtain a value lying in a row of (n×a+i) and a column of (n×b+j) of the kernel data as a value of the sub-kernel data corresponding to (i,j). Each of a and b may be a natural number of 0 or greater.

For example, assuming a case of forming the sub-kernel data identified as (2,3), the processor 120 may obtain a value lying in a row of (3×a+2) and a column of (3×b+3) of the kernel data. Each of a and b herein is a natural number 0 or greater, and thus, when each of a and b are put in the row of (3×a+2) and the column of (3×b+3) sequentially from 0, values lying in a row of (2) and a column of (3), a row of (2) and a column of (6), a row of (5) and a column of (3), and a row of (5) and a column of (6) may be obtained. A lower side of FIG. 3C shows 9 pieces of sub-kernel data and the sub-kernel data on the center of a right side among these indicates sub-kernel data identified as (2,3).

That is, when the stride information is 3, the number of pieces of the plurality of pieces of sub-kernel data to be generated may be different, compared to the case where the stride information is 2. However, the generation methods are not significantly different and the same applies to the target data. That is, when the stride information is equal to or greater than 2 in the convolution processing, the processor 120 may divide the target data and the kernel data into the plurality of pieces of sub-data and the plurality of pieces of sub-kernel data respectively through the same method as described above. Herein, the processor 120 may divide the target data and the kernel data based on the same stride information. That is, sizes of pieces the sub-kernel data respectively corresponding to the plurality of pieces of sub-data may be different from each other, but the number of the plurality of pieces of sub-data and the number of the plurality of pieces of sub-kernel data may be the same.

The stride information may be different for each of the row and the column. However, even in this case, when the row is 3 and the column is 2 in the stride information, the processor 120 may divide the target data into a plurality of 3×2 pieces of sub-data.

The processor 120 may identify each of the plurality of 3×2=6 pieces sub-data as two-dimensional information of (i,j) (each of i and j is a natural number of n or less). Herein, each of i and j is a natural number of n or less and therefore i and j may be 1, 2, and 3, and j may be 1 and 2.

The processor 120 may obtain a value lying in a row of (n×a+i) and a column of (n×b+j) of the target data as a value of the sub-data corresponding to (i,j). Each of a and b may be a natural number of 0 or greater.

That is, although the stride information is different for each of the row and the column, the target data and the kernel data may be divided through the same method as described above.

Figure 4A:
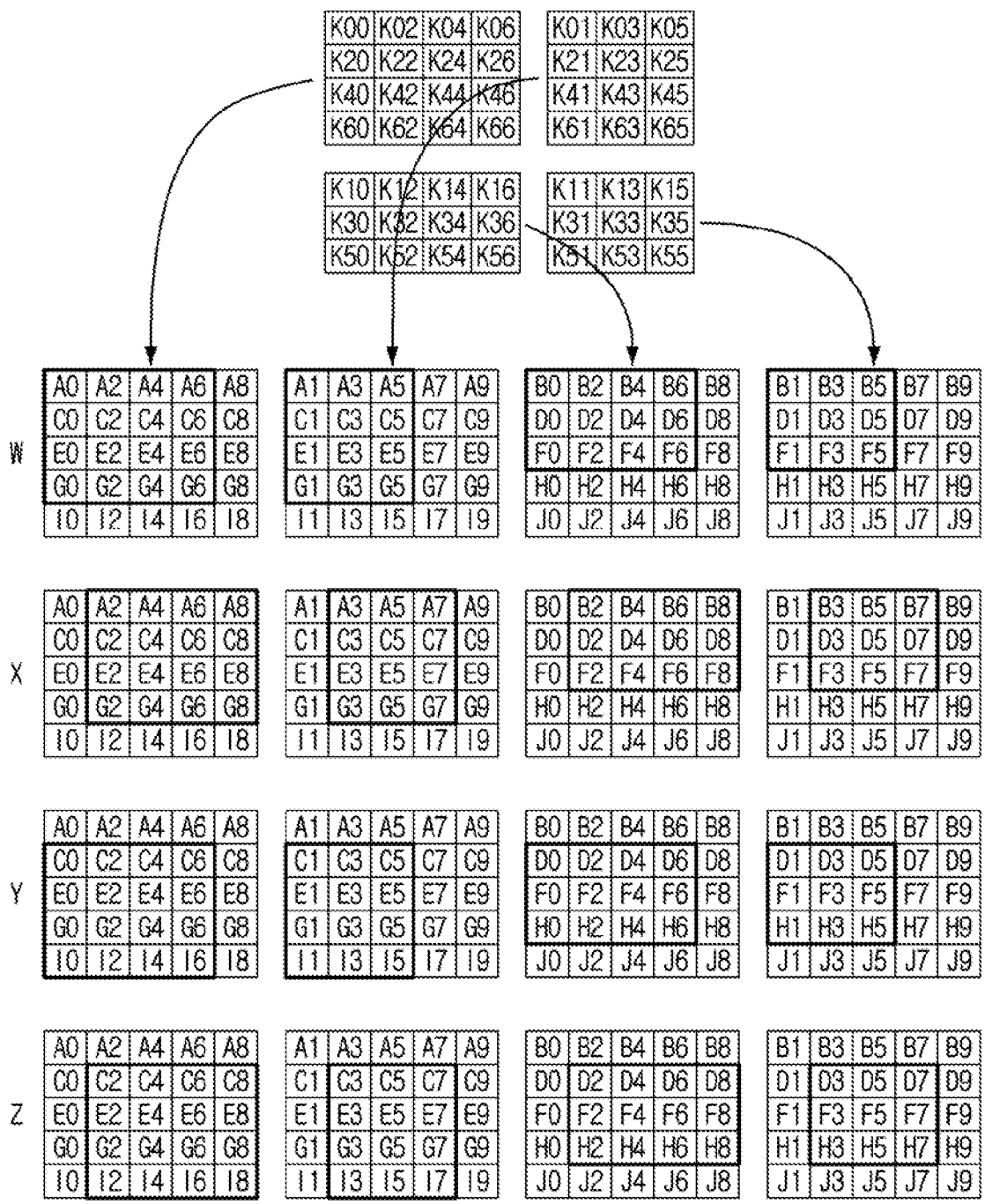
FIGS. 4A and 4B are diagrams for describing a processing method according to an embodiment.
Figure 4B:
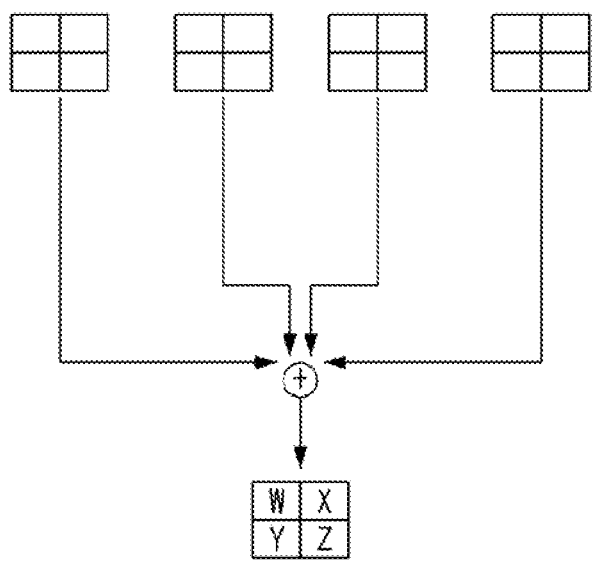

FIGS. 4A and 4B are diagrams for describing a processing method according to an embodiment of the disclosure. In FIGS. 4A and 4B, it is assumed that the plurality of pieces of sub-data of FIG. 3A and the plurality of pieces of sub-kernel data of FIG. 3B are processed.

The processor 120 may identify each of the plurality of n×n pieces of sub-data as two-dimensional information of (i,j) (each of i and j is a natural number of n or less) and identify each of the plurality of n×n pieces of sub-kernel data as two-dimensional information of (ij) (each of i and j is a natural number of n or less).

That is, the processor 120 may identify the plurality of four pieces of sub-data respectively as two-dimensional information of (1,1), (1,2), (2,1), and (2,2) and identify the plurality of four pieces of sub-kernel data respectively as two-dimensional information of (1,1), (1,2), (2,1), and (2,2).

The processor 120 may perform the convolution processing on the plurality of pieces of sub-data and the sub-kernel data corresponding to each of the plurality of pieces of sub-data. That is, as shown in FIG. 4A, the processor 120 may execute the convolution processing on the sub-data of (1,1) with the sub-kernel data of (1,1), execute the convolution processing on the sub-data of (1,2) with the sub-kernel data of (1,2), execute the convolution processing on the sub-data of (2,1) with the sub-kernel data of (2,1), and execute the convolution processing on the sub-data of (2,2) with the sub-kernel data of (2,2). The processor 120 may execute the convolution processing, in which the stride is 1, in parallel.

In particular, the processor 120 may synchronize the convolution processing on other sub-kernel data based on the convolution processing on the sub-kernel data having the largest size among the plurality of pieces of sub-kernel data. For example, in a case of the sub-kernel data of (1,1) having the largest size among the plurality of pieces of sub-kernel data in FIG. 4A, the convolution processing may be executed by moving the sub-kernel data to the right side once, changing the row, and moving the sub-kernel data of to the right side once again.

The processor 120 may synchronize the movement of the sub-kernel data of (1,2), (2,1), and (2,2) synchronously with the movement of the sub-kernel data of (1,1). Using the sub-kernel data of (2,2) as an example, the processor 120 may execute the convolution processing by first moving the sub-kernel data of (2,2) to the right side, and omitting the further movement to the right side, changing the row in the same manner as in the case of the sub-kernel data of (1,1), and moving to the right side once again. In addition, the processor 120 may also move the sub-kernel data of (2,2) to the right side again in the second row once again and move to the third row, but this may also be omitted.

FIG. 4B shows respective processing results of (1,1), (1,2), (2,1), and (2,2). The processor 120 may synchronize the convolution processing on the other sub-kernel data based on the convolution processing on the sub-kernel data having the largest size among the plurality of pieces of sub-kernel data, and accordingly, the sizes of all of the processing results may be the same as each other.

The processor 120 may combine the plurality of processing results for each element. The final convolution processing result obtained by the combining may be the same as the result obtained by performing the convolution processing on the target data and the kernel data based on the stride of 2.

Figure 5A:
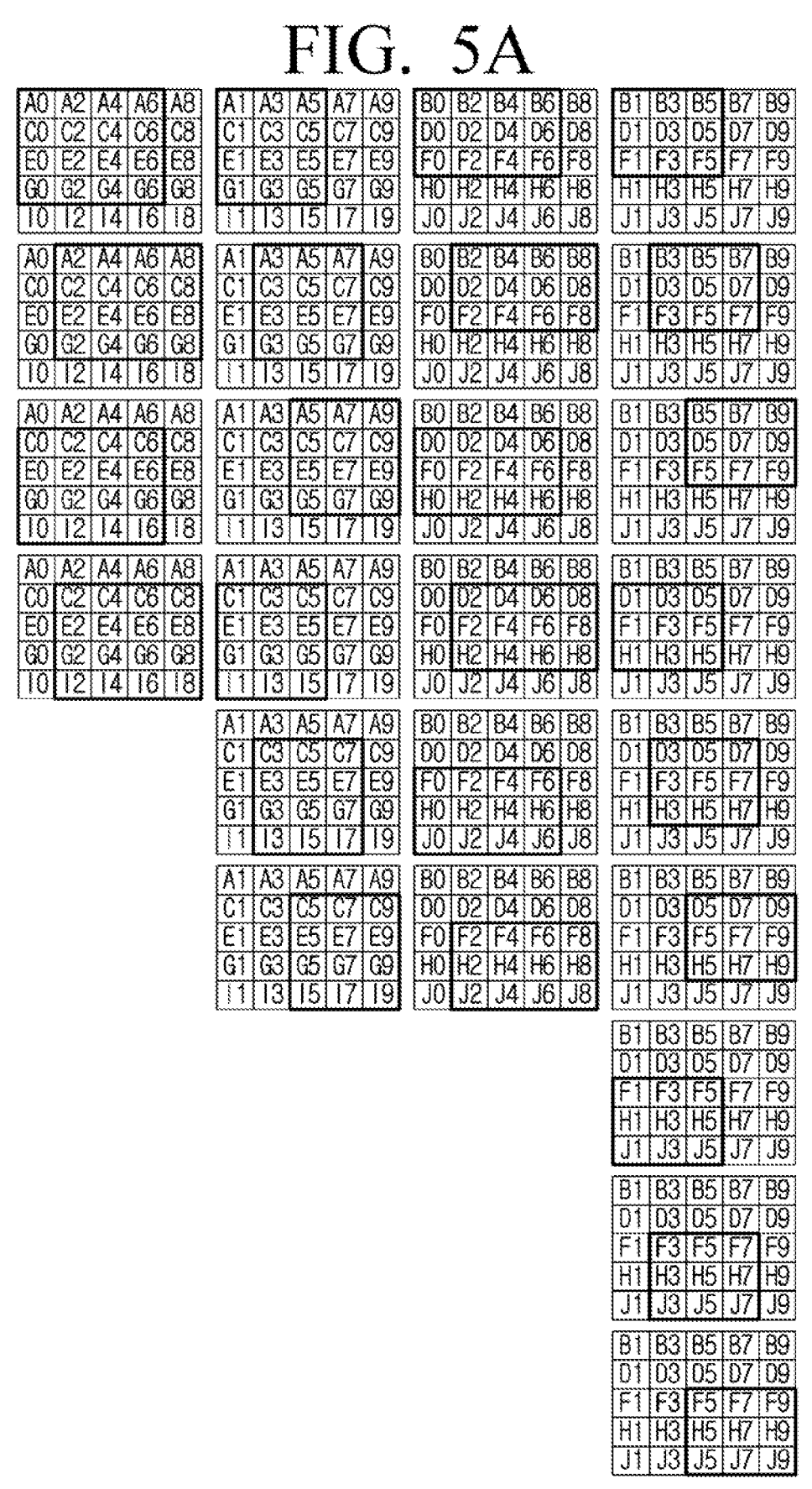
Figure 5B:
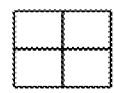
Figure 5B:
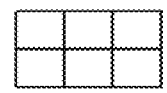
Figure 5B:
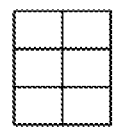
Figure 5B:
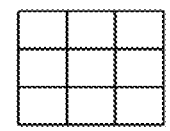

FIGS. 5A and 5B are diagrams for describing a processing method according to another embodiment of the disclosure. In FIGS. 5A and 5B, it is assumed that the plurality of pieces of sub-data of FIG. 3A and the plurality of pieces of sub-kernel data of FIG. 3B are processed, in the same manner as in FIGS. 4A and 4B. However, in FIG. 5A, the plurality of pieces of the sub-kernel data are omitted.

In the same manner as described above, the processor 120 may identify the plurality of pieces of sub-data and the plurality of pieces of sub-kernel data as two-dimensional information, and perform the convolution processing on the plurality of pieces of sub-data and the sub-kernel data respectively corresponding to the plurality of pieces of sub-data. The processor 120 may execute the convolution processing, in which the stride is 1, in parallel.

Meanwhile, the processor 120 may execute unsynchronized convolution processing other than the synchronized convolution processing of FIGS. 4A and 4B. In this case, the processor 120 may individually perform the convolution processing on the plurality of pieces of sub-data and the sub-kernel data respective corresponding to the plurality of pieces of sub-data, without needs to detect the sub-kernel data having the largest size among the plurality of pieces of sub-kernel data.

Accordingly, the number of movements of the sub-kernel data of (1,2), (2,1) and (2,2) having a relatively smaller size of the sub-kernel data on the corresponding sub-data may be greater than the case of FIGS. 4A and 4B.

For example, the convolution processing on the sub-kernel data of (1,2) may be executed by moving this to the right side once in each row and then moving to the right side once again. That is, compared to the case of FIG. 4A, two times of processing may be additionally performed for the sub-kernel data of (1,2) of FIG. 5A. In the similar manner, compared to the case of FIG. 4A, two times of processing may be additionally performed for the sub-kernel data of (2,1) of FIG. 5A, and five times of processing may be additionally performed for the sub-kernel data of (2,2).

FIG. 5B shows respective processing results of (1,1), (1,2), (2,1), and (2,2). The sizes of all of the processing results may be different from each other, since the processor 120 executes the unsynchronized convolution processing.

Figure 5C:
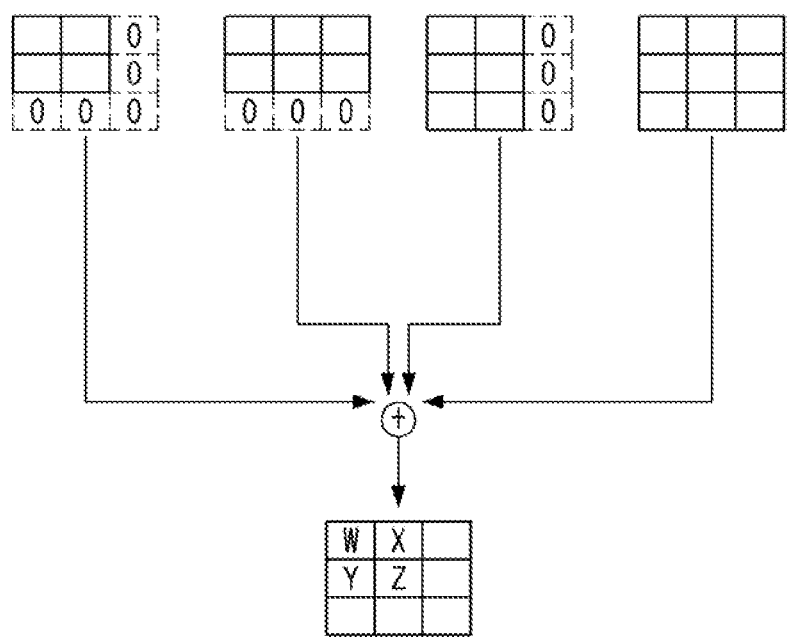

As shown in FIG. 5C, the processor 120 may extend the sizes of the other matrices based on the matrix having the largest size among the plurality of processing results. The processor 120 may extend the sizes of other matrices so that the extended region has a value of 0.

The processor 120 may combine the plurality of processing results for each element. After the extension, the sizes of all of the matrices are the same as each other, and thus, the combining method is the same as described in FIG. 4B.

Hereinafter, the processor 120 may obtain the final convolution processing result from the combined result based on the matrix having the smallest size among the plurality of processing results. For example, as shown in FIG. 5C, the processor 120 may obtain only a value of 2×2 on the upper left side as the final convolution processing result from the combined result of 3×3 based on the matrix of 2×2 which is the processing result of (1,1) having the smallest size among the plurality of processing results.

The final convolution processing result obtained by the combining may be the same as the result obtained by performing the convolution processing on the target data and the kernel data based on the stride of 2.

FIG. 6 is a diagram for describing a processing method of three-dimensional data according to an embodiment of the disclosure.

As shown in FIG. 6, each of target data (feature map) and kernel data may be three-dimensional data having a depth in addition to the row and the column.

The processor 120 may divide each of the target data and the kernel data based on stride information. The processor 120 may divide each of the target data and the kernel data by only considering the row and the column, regardless of the depth.

Accordingly, as shown in FIG. 6, the processor 120 may generate 4 pieces of sub-data and 4 pieces sub-kernel data, and each piece of data may be three-dimensional data having a depth in addition to the row and the column.

The processor 120 may execute the convolution processing, in which the stride is 1, in parallel and combine a plurality of processing results for each element. Herein, at the time of combining for each element, the processor 120 may consider the depth, in addition to the row and the column.

FIG. 7 is a diagram for describing a specific configuration of the processor 120 according to an embodiment of the disclosure.

As shown in FIG. 7, the processor 120 may include a data scatter 121, a plurality of processing element units 122, and an accumulator 123.

The data scatter 121 has one side connected to the storage 110 and may receive the target data from the storage 110 and divide the target data into the plurality of pieces of sub-data.

The data scatter 121 has the other side connected to each of the plurality of processing element units 122 and may transmit the plurality of pieces of sub-data respectively to the plurality of processing element units 122.

The plurality of processing element units 122 may include a plurality of processing elements each arranged in a matrix form. That is, a first processing element unit 122-1, a second processing element unit 122-2, a third processing element unit 122-3, and a fourth processing element unit 122-4 may include a plurality of processing elements each arranged in a matrix form.

FIG. 7 only shows four processing element units of the first processing element unit 122-1, the second processing element unit 122-2, the third processing element unit 122-3, and the fourth processing element unit 122-4, but there is no limitation thereto, and any other number of processing element units may be formed. In addition, all of the first processing element unit 122-1, the second processing element unit 122-2, the third processing element unit 122-3, and the fourth processing element unit 122-4 may be the same as each other or different from each other.

Between the adjacent processing elements in each processing element unit, the data shift in one direction or data shift in both directions may be performed. FIG. 7 shows that some processing elements adjacent to each other perform data shift only in a downward direction, but this is merely an embodiment, and the shift in both directions may also be performed.

Each processing element may basically include a multiplier and an arithmetic logic unit (ALU), and the ALU may include at least one or more adders. The processing element may execute the basic arithmetic operations using the multiplier and the ALU. However, there is no limitation thereto, and the processing element may be formed with any other structures, as long as it can execute functions such as the basic arithmetic operations, shift, and the like.

Each processing element may include a register for storing data. For example, each processing element may store a register for storing a processing result in a specific cycle. Alternatively, each processing element may include a register for storing a processing result shifted from the adjacent processing element, after shifting the processing result in a specific cycle to the adjacent processing element.

Each of the plurality of processing element units 122 may perform the convolution processing on the sub-data received from the data scatter 121 based on the corresponding sub-kernel data, and transmit the processing result to the accumulator 123.

When the corresponding sub-kernel data is stored in the storage 110 in advance, each of the plurality of processing element units 122 may receive the corresponding sub-kernel data from the storage 110.

Alternatively, the storage 110 may only store the kernel data other than the corresponding sub-kernel data. In this case, the processor 120 may further comprise a kernel data scatter (not shown) for dividing the kernel data.

The kernel data scatter (not shown) may receive the kernel data from the storage 110, divide the kernel data, and transmit this to the corresponding processing element unit.

Alternatively, the data scatter 121 and the kernel data scatter (not shown) may be integrated. In this case, the integrated scatter may sequentially receive the target data and the kernel data, divide each data in a suitable cycle, and transmit each data to the corresponding processing element unit.

The convolution processing method through the processing elements is a generally well-known method, and therefore, the detailed description regarding this will be omitted.

The accumulator 123 has one side connected to each of the plurality of processing element units 122 and the other side connected to the storage 110, and may receive the plurality of processing results respectively from the plurality of processing element units 122 and combine the plurality of received processing results.

FIG. 8 is a flowchart for describing a control method of an electronic device according to an embodiment of the disclosure.

First, based on first stride information that indicates an interval at which kernel data is applied to target data, the target data is divided into a plurality of pieces of sub-data (S810). The convolution processing is performed on the plurality of pieces of sub-data and the plurality of pieces of sub-kernel data respectively corresponding to the plurality of pieces of sub-data based on second stride information that is different from the first stride information (S820). Then, a plurality of processing results are combined (S830). The plurality of pieces of sub-kernel data are obtained by dividing the kernel data based on the first stride information, and the second stride information indicates that the interval at which the kernel data is applied to the target data is 1.

In Step S810 of dividing, based on the first stride information that is n (n is an integer greater than 1), the target data may be divided into a plurality of n×n pieces of sub-data. The plurality of pieces of sub-kernel data may be obtained by dividing the kernel data into n×n pieces.

Step S810 of dividing may include a step of identifying each of the plurality of n×n pieces of sub-data as two-dimensional information of (ij) (each of i and j is a natural number of n or less), and a step of obtaining a value lying in a row of (n×a+i) and a column of (n×b+j) of the target data as a value of the sub-data corresponding to (i,j). Each of a and b may be a natural number of 0 or greater.

The plurality of processing results may be in matrix forms having different sizes, and Step S830 of combining may include, based on a first matrix having a largest size among the plurality of processing results, a step of extending sizes of other matrices, and a step of combining values at the same position between values included in the first matrix and values included in the extended other matrices. An extended region of the other matrices may have a value of 0.

In Step S810 of dividing, based on the first stride information in which a row is m (m is an integer greater than 1) and a column is n (n is an integer greater than 1), the target data may be divided into a plurality of m×n pieces of sub-data. The plurality of pieces of sub-kernel data may be obtained by dividing the kernel data into m×n pieces.

The method may further comprise, based on the first stride information that is n (n is an integer greater than 1), a step of dividing the kernel data into a plurality of n×n pieces of sub-kernel data, and a step of performing the convolution processing on the plurality of pieces of sub-data and a plurality of pieces of sub-kernel data respectively corresponding to the plurality of pieces of sub-data based on the second stride information.

Step S810 of dividing may include a step of identifying each of the plurality of n×n pieces of sub-kernel data as two-dimensional information of (ij) (each of i and j is a natural number of n or less), and a step of obtaining a value lying in a row of (n×a+i) and a column of (n×b+j) of the kernel data as a value of the sub-kernel data corresponding to (i,j). Each of a and b may be a natural number of 0 or greater.

In Step S820 of performing the convolution processing, the convolution processing may be executed using the plurality of pieces of sub-kernel data included in a sub-kernel data set corresponding to the first stride information among a plurality of sub-kernel data sets stored in advance. The plurality of sub-kernel data sets may be obtained by dividing the kernel data based on pieces of stride information different from each other.

According to various embodiments of the disclosure described above, even when the interval at which the kernel data is applied to the target data is 2 or greater, the electronic device may improve the hardware utilization by executing the convolution processing at an interval of 1.

According to an embodiment of the disclosure, various embodiments described above may be implemented as software including instructions stored in machine (e.g., computer)-readable storage media. The machine herein is an apparatus which invokes instructions stored in the storage medium and is operated according to the invoked instructions, and may include an electronic device (e.g., electronic device (A)) according to the disclosed embodiments. In a case where the instruction is executed by a processor, the processor may execute a function corresponding to the instruction directly or using other elements under the control of the processor. The instruction may include a code generated by a compiler or executed by an interpreter. The machine-readable storage medium may be provided in a form of a non-transitory storage medium. Here, the term "non-transitory" merely mean that the storage medium is tangible while not including signals, and it does not distinguish that data is semi-permanently or temporarily stored in the storage medium.

In addition, according to an embodiment of the disclosure, the methods according to various embodiments of the disclosure described above may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be temporarily stored or temporarily generated at least in a storage medium such as a memory of a server of a manufacturer, a server of an application store, or a relay server.

Further, according to an embodiment of the disclosure, various embodiments described above may be implemented in a computer (or similar device)-readable storage media using software, hardware, or a combination thereof. In some cases, the embodiments described in this specification may be implemented as a processor itself. According to the implement in terms of software, the embodiments such as the procedures and the functions described in this specification may be implemented as separate software modules. Each of the software modules may execute one or more functions and operations described in this specification.

Computer instructions for executing processing operations of a machine according to various embodiments described above may be stored in a non-transitory computer-readable medium. When the computer instructions stored in the non-transitory computer-readable medium is executed by a processor of a specific machine, a processing operation of the machine according to various embodiments described above may be executed by the specific machine. The non-transitory computer-readable medium is not a medium storing data for a short period of time such as a register, a cache, or a memory, but mean a medium that semi-permanently stores data and is readable by a machine. Specific examples of the non-transitory computer-readable medium may include a CD, a DVD, a hard disk, a Blu-ray disc, a USB, a memory card, and a ROM.

In addition, each of the elements (for example, a module or a program) according to various embodiments described above may be composed of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. An electronic device comprising:
    a storage; and
    a processor configured to perform convolution processing on target data and kernel data based on stride information that indicates an interval at which the kernel data is applied to the target data stored in the storage, wherein the processor is further configured to:
    divide the target data into a plurality of pieces of sub-data based on first stride information,
    perform the convolution processing on the plurality of pieces of sub-data and a plurality of pieces of sub-kernel data respectively corresponding to the plurality of pieces of sub-data based on second stride information that is different from the first stride information, and
    combine a plurality of processing results according to the convolution processing by combining the plurality of processing results for each element,
    wherein the plurality of pieces of sub-kernel data are obtained by dividing the kernel data based on the first stride information,
    wherein the second stride information indicates that the interval at which the kernel data is applied to the target data is 1,
    wherein at least one of the storage or the processor is a hardware component of the electronic device, and
    wherein the processor is further configured to perform the convolution processing by moving each of the plurality of pieces of sub-kernel data on sub-data corresponding to the each of the plurality of pieces of sub-kernel data by one pixel.

2. The device according to claim 1, wherein the processor is further configured to, based on the first stride information that is n (n is an integer greater than 1), divide the target data into a plurality of n×n pieces of sub-data, and
    wherein the plurality of pieces sub-kernel data are obtained by dividing the kernel data into n×n pieces.

3. The device according to claim 2, wherein the processor is further configured to identify each of the plurality of n×n pieces of sub-data as two-dimensional information of (i,j) (each of i and j is a natural number of n or less) and obtain a value lying in a row of (n×a+i) and a column of (n×b+j) of the target data as a value of the sub-data corresponding to (i,j), and
    wherein each of a and b is a natural number of 0 or greater.

4. The device according to claim 1, wherein the plurality of processing results are in matrix forms having different sizes,
    wherein the processor is further configured to, based on a first matrix having a largest size among the plurality of processing results, extend sizes of other matrices, and combine values at the same position between values included in the first matrix and values included in the extended other matrices, and
    wherein an extended region of the other matrices has a value of 0.

5. The device according to claim 1, wherein the processor comprises:
    a plurality of processing element units comprising a plurality of processing elements each arranged in a matrix form;
    a data scatter having one side connected to the storage and the other side connected to each of the plurality of processing element units; and
    an accumulator having one side connected to each of the plurality of processing element units and the other side connected to the storage.

6. The device according to claim 5, wherein the data scatter receives the target data from the storage, divides the target data into the plurality of pieces of sub-data, and transmits the plurality of pieces of sub-data respectively to the plurality of processing element units,
    wherein each of the plurality of processing element units performs the convolution processing based on sub-kernel data corresponding to the sub-data received from the data scatter and transmits processing results to the accumulator, and
    wherein the accumulator combines the plurality of processing results respectively received from the plurality of processing element units.

7. The device according to claim 1, wherein the processor is further configured to, based on the first stride information in which a row is m (m is an integer greater than 1) and a column is n (n is an integer greater than 1), divide the target data into a plurality of m×n pieces of sub-data, and
    wherein the plurality of pieces of sub-kernel data are obtained by dividing the kernel data into m×n pieces.

8. The device according to claim 1, wherein the processor is further configured to, based on the first stride information that is n (n is an integer greater than 1), divides the kernel data into a plurality of n×n pieces of sub-kernel data, and performs the convolution processing on the plurality of pieces of sub-data and a plurality of pieces of sub-kernel data respectively corresponding to the plurality of pieces of sub-data based on the second stride information.

9. The device according to claim 8, wherein the processor is further configured to identify each of the plurality of n×n pieces of sub-kernel data as two-dimensional information of (i,j) (each of i and j is a natural number of n or less) and obtain a value lying in a row of (n×a+i) and a column of (n×b+j) of the kernel data as a value of the sub-kernel data corresponding to (i,j), and
    wherein each of a and b is a natural number of 0 or greater.

10. The device according to claim 1, wherein the processor is further configured to execute the convolution processing using the plurality of pieces of sub-kernel data included in a sub-kernel data set corresponding to the first stride information among a plurality of sub-kernel data sets stored in the storage in advance, and
    wherein the plurality of sub-kernel data sets are obtained by dividing the kernel data based on pieces of stride information different from each other.

11. A control method of an electronic device including a storage and a processor, the method comprising:
    based on first stride information that indicates an interval at which kernel data is applied to target data, dividing, by the processor, the target data into a plurality of pieces of sub-data, the target data being stored in the storage;
    performing, by the processor, convolution processing on the plurality of pieces of sub-data and a plurality of pieces of sub-kernel data respectively corresponding to the plurality of pieces of sub-data based on second stride information that is different from the first stride information; and combining, by the processor, a plurality of processing results according to the convolution processing by combining the plurality of processing results for each element, wherein the plurality of pieces of sub-kernel data are obtained by dividing the kernel data based on the first stride information, wherein the second stride information indicates that the interval at which the kernel data is applied to the target data is 1, wherein at least one of the storage or the processor is a hardware component of the electronic device, and wherein the performing comprises performing the convolution processing by moving each of the plurality of pieces of sub-kernel data on sub-data corresponding to the each of the plurality of pieces of sub-kernel data by one pixel.

12. The method according to claim 11, wherein, based on the first stride information that is n (n is an integer greater than 1), the dividing comprises dividing the target data into a plurality of n×n pieces of sub-data, and wherein the plurality of pieces of sub-kernel data are obtained by dividing the kernel data into n×n pieces.

13. The method according to claim 12, wherein the dividing comprises:

identifying each of the plurality of n×n pieces of sub-data as two-dimensional information of (i,j) (each of i and j is a natural number of n or less); and obtaining a value lying in a row of (n×a+i) and a column of (n×b+j) of the target data as a value of the sub-data corresponding to (i,j), and wherein each of a and b is a natural number of 0 or greater.

14. The method according to claim 11, wherein the plurality of processing results are in matrix forms having different sizes, and wherein the combining comprises:

based on a first matrix having a largest size among the plurality of processing results, extending sizes of other matrices; and combining values at the same position between values included in the first matrix and values included in the extended other matrices, and wherein an extended region of the other matrices has a value of 0.

15. The method according to claim 11, wherein the dividing comprises, based on the first stride information in which a row is m (m is an integer greater than 1) and a column is n (n is an integer greater than 1), dividing the target data into a plurality of m×n pieces of sub-data, and wherein the plurality of pieces of sub-kernel data are obtained by dividing the kernel data into m×n pieces.

* * * * *